(12) United States Patent
Schlack et al.

(10) Patent No.: US 8,793,349 B2
(45) Date of Patent: Jul. 29, 2014

(54) MANAGEMENT AND USE OF CHANNEL CONFIGURATION INFORMATION

(75) Inventors: John Schlack, Quakertown, PA (US); Charles A. Hasek, IV, Bromfield, CO (US)

(73) Assignees: Beaumaris Networks Inc., Boxborough, MA (US), part interest; Time Warner Cable Enterprises LLC, New York, NY (US), part interest ( * ) Notice: Subject to any disclaimer, the term of this patent is extended or adjusted under 35 U.S.C. 154(b) by 203 days.

(21) Appl. No.: 13/006,763

(22) Filed: Jan. 14, 2011

(65) Prior Publication Data

US 2011/0173304 A1    Jul. 14, 2011

Related U.S. Application Data

(60) Provisional application No. 61/295,004, filed on Jan. 14, 2010.

(51) Int. Cl.
*G06F 15/177* (2006.01)
*H04N 7/173* (2011.01)

(52) U.S. Cl.
USPC ............................................. 709/220; 725/114

(58) Field of Classification Search
CPC ........................ H04L 29/06; H04L 29/08072
USPC ............... 709/228; 725/86, 138, 143, 151
See application file for complete search history.

(56) References Cited

U.S. PATENT DOCUMENTS

| | | | |
|---|---|---|---|
| 6,775,843 B1 * | 8/2004 | McDermott ................. | 725/151 |
| 7,305,696 B2 * | 12/2007 | Thomas et al. ............... | 725/114 |
| 7,426,563 B2 * | 9/2008 | Morita et al. ................ | 709/228 |
| 8,199,651 B1 * | 6/2012 | Schrempp et al. ........... | 370/235 |
| 2007/0133565 A1 * | 6/2007 | Hyun et al. ............... | 370/395.52 |
| 2008/0127285 A1 * | 5/2008 | Broberg ........................ | 725/105 |
| 2008/0141317 A1 | 6/2008 | Radloff et al. | |
| 2008/0184328 A1 * | 7/2008 | Kim et al. ..................... | 725/151 |
| 2009/0156181 A1 | 6/2009 | Athsani et al. | |
| 2009/0187575 A1 | 7/2009 | Dacosta | |

OTHER PUBLICATIONS

International Search Report mailed Apr. 25, 2011 from corresponding International Application No. PCT/US2011/021280.

* cited by examiner

*Primary Examiner* — Lynn Feild
*Assistant Examiner* — Timothy Sowa
(74) *Attorney, Agent, or Firm* — Patent Capital Group

(57) ABSTRACT

A configuration as discussed herein includes a content management system. The content management system can reside in a central location or be distributed amongst multiple different locations in a network environment. In general, the content management system keeps track of configuration information for the retrieval of content. For example, the content management system identifies a presence of one or more content delivery sources in the network environment. The content management system utilizes the contact information to communicate with content delivery sources for discovery of configuration information. The configuration information can indicate: i) a respective address of the content delivery source, ii) a type of content outputted by the respective address, iii) a format of the content such as streaming data outputted by the respective address. The configuration information can be used to identify an address in which to retrieve requested content according to a desired format.

20 Claims, 12 Drawing Sheets

| Unique Name/ID | Mgmt IP Address | Device Type | Location |
|---|---|---|---|
| National.Encoder01 | 10.100.3.4 | Encoder Type 1000 | National.Loc1 |
| National.Encoder02 | 10.100.3.101 | Encoder Type 1000 | National.Loc1 |
| Local.Encoder01 | 10.101.5.12 | Encoder Type 2000 | Philly.Loc2 |

CONTACT INFORMATION 300

FIG. 3

| Channel | Device | Input Address | Output Target |
|---|---|---|---|
| USA | Encoder | 10.100.1.1 | 10.100.2.1 |
| | Transcoder | 10.100.2.1 | 10.100.3.1 |
| | Rate Shaper | 10.100.3.1 | 10.100.4.1 |
| | Encryptor | 10.100.4.1 | 224.1.1.1 |
| HIST | Encoder | 10.100.1.1 | 10.100.2.1 |
| | Transcoder | 10.100.2.1 | 10.100.3.1 |
| | Rate Shaper | 10.100.3.1 | 10.100.4.1 |
| | Encryptor | 10.100.4.1 | 224.1.1.2 |

PATH CONFIGURATION INFORMATION 400

FIG. 4

| Channel Name | Actual Name | Source ID |
|---|---|---|
| HBOE | HBO EAST | 1104 |
| HBO_E | HBO EAST | 1104 |
| HBO E | HBO EAST | 1104 |
| HBO EAST | HBO EAST | 1104 |
| HBO EAST | HBO EAST | 1104 |
| USA | USA | 1200 |

| Source ID | Name | Codec | HD/SD | Bit Rate | Multicast Address |
|---|---|---|---|---|---|
| 1104 | HBO East | MPEG-2 | SD | 3.75 Mbps | 224.1.1.1 |
| 1104 | HBO East | MPEG-2 | HD | 15.0 Mbps | 224.1.1.2 |
| 1104 | HBO East | H.264 | SD | 2.0 Mbps | 224.1.1.3 |
| 1104 | HBO East | H.264 | HD | 8.0 Mbps | 224.1.1.4 |
| 1200 | USA | MPEG-2 | SD | 3.75 Mbps | 224.1.1.5 |
| 1200 | USA | MPEG-2 | HD | 15.0 Mbps | 224.1.1.6 |
| 1200 | USA | H.264 | SD | 2.0 Mbps | 224.1.1.7 |
| 1200 | USA | H.264 | HD | 8.0 Mbps | 224.1.1.8 |

CONFIGURATION INFORMATION
600

FIG. 6

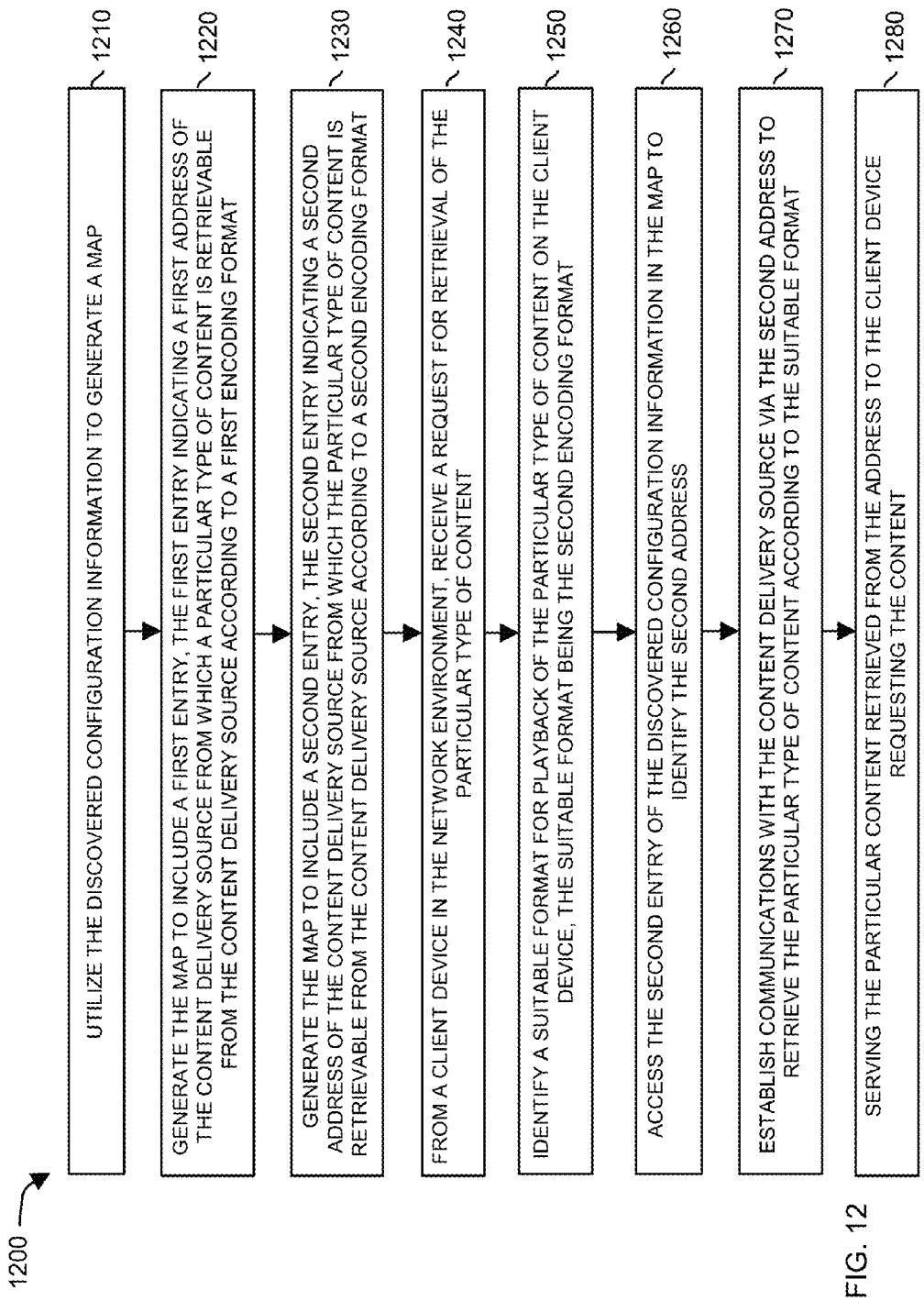

MANAGEMENT AND USE OF CHANNEL CONFIGURATION INFORMATION

RELATED APPLICATIONS

This application is related to and claims the benefit of earlier filed U.S. Provisional Patent Application Ser. No. 61/295,004 entitled "LINEAR CONTENT DISCOVERY," filed on Jan. 14, 2010, the entire teachings of which are incorporated herein by this reference.

BACKGROUND

Internet Protocol (IP) based video delivery of digital content is becoming increasingly popular. In accordance with such technology, a client may request IP-based video from a streaming server to view video on a client device such as a television, computer, mobile device, or other device suitable for watching or storing IP-based video content. Typically, the streaming server services a request by streaming the requested content to the client through, for example, a cable modem, an Internet connection, etc., in a customer's home network.

Via communication with a service provider, clients can receive digital content or streaming data originating from a number of different local and remote sources. For example, a conventional service provider can receive nationwide available channels of data from a national data center as well as locally available channels of data from a local data center. Typically, through the conventional service provider, the clients can choose amongst the nationally available channels and locally available channels for retrieval.

The formatting of available content for each content channel (whether it is a locally available channel with respect to the conventional service provider or a nationally available channel) can vary. As an example, a national content distribution center can be configured to distribute content X (e.g., content such as that provided by the HBO® channel) according to a number of different streaming formats such as a first format, second format, third format, etc. The first version of formatted content X can be available from a first address of the national content distribution center, the second version of formatted content X can be available from a second address of the national content distribution center, a third version of formatted content X can be available from a third address of the national content distribution center, and so on.

In order to stream content from the national content distribution center to a respective client, the service provider typically must keep track of these different access addresses and the different format types for the available content. Upon receiving a request for content from a subscriber, the conventional service provider selects an appropriate address that is configured to distribute the requested content. The service provider then utilizes the selected address to retrieve and forward the requested content to the respective client who made the request.

BRIEF DESCRIPTION

Conventional implementations of content distribution such as those discussed above can suffer from a number of deficiencies. For example, conventional implementations of content delivery must manually keep track of configuration information. Manual tracking of configuration information can be costly and prone to error.

Embodiments herein deviate with respect to conventional applications. For example, embodiments herein are directed to unique ways of tracking configuration information for distribution of content in a content distribution environment.

As an example, one embodiment herein includes a content management system. The content management system can reside in a central location or be distributed amongst multiple different locations in a network. In general, the content management system keeps track of configuration information for the retrieval of content. For example, in one embodiment, the content management system identifies a presence of one or more content delivery sources in the network environment. The content management system retrieves contact information to communicate with the one or more content delivery sources. The contact information can include management addresses with which to communicate with each of the one or more content delivery sources.

In one embodiment, via the contact information, the content management system can receive device type information and location information associated with the content delivery sources. The device type information indicates respective device types of the content delivery sources. The location information indicates respective locations of the one or more content delivery source in the network environment. Accordingly, via contact information, the content management system can be configured to know information about the devices with which it will communicate to retrieve the configuration information.

In further embodiments, the content management system utilizes the contact information (i.e., management address) to initiate communications with each content delivery source to discover configuration information. For example, via communications with one or more content delivery source, the content management system discovers configuration information indicating: i) an address of the content delivery source, ii) a type of content outputted by the address, iii) a format of the content such as streaming data outputted by the address.

The content management system can utilize the discovered information to generate a table (e.g., map, listing of access information, etc.). For each respective available stream of data amongst multiple available streams of data, the access information or access map can include: i) an address of the content delivery source on which to receive the respective streaming data, ii) a type associated with streaming data outputted by the address, iii) format attributes of the streaming data outputted by the address, etc. In accordance with another embodiment, after discovering the configuration data, the content management system can be configured to "normalize" the data. That is, the content management system can be configured to translate the configured station/network names into recognized network identifiers (a.k.a. channel name mapping).

In yet further embodiments such as a distributed system, each content management system discovers configuration information and distributes the retrieved contact information to other remote content management sources located in a network environment. Additionally, each content management system can be configured to receive the discovered configuration information from other content management systems. Thus, each of the content management systems communicates the information they discovered about available streams of content to each other. Accordingly, it is not necessary that each content management system contact each content delivery source in a network environment as a single content management system can contact a respective content delivery source and notify other content management systems of the retrieved configuration information.

As an alternative to the embodiments above, the content management system can be a central communication system configured to communicate with each of multiple remote server sources to retrieve the configuration information.

In yet further embodiments, the one or more content management systems can be configured to distribute the discovered configuration information to a centrally located repository configured to compile, at the central location, a mapping or listing of configuration information received from different content delivery sources.

As previously discussed, each of the one or more content management systems or centrally located content management system merges the discovered configuration information with other discovered configuration information to produce a listing of different types of content available from multiple disparately located content delivery sources in the network environment.

In one embodiment, based on the discovered configuration information, the content management system generates the map to include multiple entries such as a first entry, second entry, etc. The first entry of the map can indicate a first address of a respective content delivery source from which a particular type of content is retrievable from the content delivery source according to a first encoding format; the second entry in the map can indicate a second address of the content delivery source from which the particular type of content is retrievable from the content delivery source according to a second encoding format; and so on.

The content management system can store information indicating groups of addresses from which different types of content can be retrieved. Different addresses within a particular address grouping can be used to retrieve content according to different streaming formats.

A content server can utilize the map of access information to deliver content to a client device or subscriber in the network environment. For example, the content server can receive a request for retrieval of a particular type of content. Via access information, the content server identifies a suitable format for playback of the particular type of content on the client device. Assume in this example that the suitable format for playing back the requested content on the requesting client device is a second encoding format. Via entries in the map of configuration information, the content server identifies a group of one or more content delivery sources that are capable of delivering the requested content. From the identified group, the content server identifies and selects an address of a content delivery source that is configured to distribute the requested content according to the suitable format.

In this example, via the access map, assume in this example that the content server identifies that the second address can be used to retrieve the requested content according to a format suitable for playback by the client device. The content server establishes communications with a respective content delivery source via the second address to retrieve the requested content according to the suitable format. In one embodiment, the content server utilizes the second address to join a multicast session to retrieve the content for distribution to the requesting subscriber.

The content server forwards the requested content to the client device making the request. Alternatively, the content server stores the retrieved data stream for subsequent delivery to the requesting client.

These and other more specific embodiments are disclosed in more detail below.

Note that embodiments herein can include a configuration of one or more computerized devices, servers, data management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for managing access information. For example, in one embodiment, the instructions, when executed by a processor of a respective computer device, cause the processor to: identify a presence of a content delivery source in the network environment; obtain contact information to communicate with the content delivery source; and utilize the contact information to initiate communications with the content delivery source to discover configuration information, the discovered configuration information can indicate: i) an address of the content delivery source, ii) a type of content outputted by the address, and iii) a format of the content outputted by the address.

Accordingly, another particular embodiment of the present disclosure is directed to a method and/or computer program product that includes a computer readable storage medium having instructions stored thereon for managing access information. For example, in one embodiment, the method and/or instructions, when executed by a processor of a respective computer device, cause the processor to: configure a content delivery source in the network environment with an address of a content management system configured to keep track of content outputted by multiple content delivery sources including the content delivery source; at the content management system, communicate with the content delivery source to receive configuration information configuration information indicating: i) an address of the content delivery source, ii) a type of content outputted by the address, and iii) a format of the content outputted by the address.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, as a hybrid of software and hardware, or as hardware alone such as within a processor, or within an operating system or a within a software application. Example embodiments of the invention may be implemented within products and/or software applications such as those manufactured by BEAUMARIS NETWORKS™, Inc., Boxborough, Mass., USA.

As discussed herein, techniques herein are well suited for use in applications such as content servers and streaming of data. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3 is a diagram illustrating an example of contact information used to communicate with one or more content delivery sources for discovery of configuration information according to embodiments herein.

FIG. 4 is a diagram illustrating an example of retrieved path configuration information for each of multiple data delivery channels according to embodiments herein.

FIG. 6 is a diagram illustrating an example of retrieved configuration information for each of multiple data delivery channels according to embodiments herein.

FIGS. 9-12 are flowcharts illustrating example methods according to embodiments herein.

DETAILED DESCRIPTION

Embodiments herein include a content management system. The content management system can reside in a central location or can be distributed amongst multiple different locations in a network environment.

In general, the content management system (such as a distributed system or central system) automatically keeps track of configuration information for the retrieval of content according to a selected one of multiple different possible formats.

For example, in accordance with one embodiment, via contact information, the content management system identifies a presence of one or more content delivery sources in the network environment. Each of the one or more content delivery sources is a source from which content can be retrieved. The content management system utilizes contact information to identify and subsequently communicate with the content delivery sources for discovery of configuration information.

The retrieved configuration information can include information such as: i) a respective address of the content delivery source, ii) a type of content outputted by the respective address, iii) a format of the content such as streaming data outputted by the respective address. Subsequent to discovery, the configuration information can be used to identify an address in which to retrieve requested content according to a desired format of multiple possible encoding formats.

Figure 1:
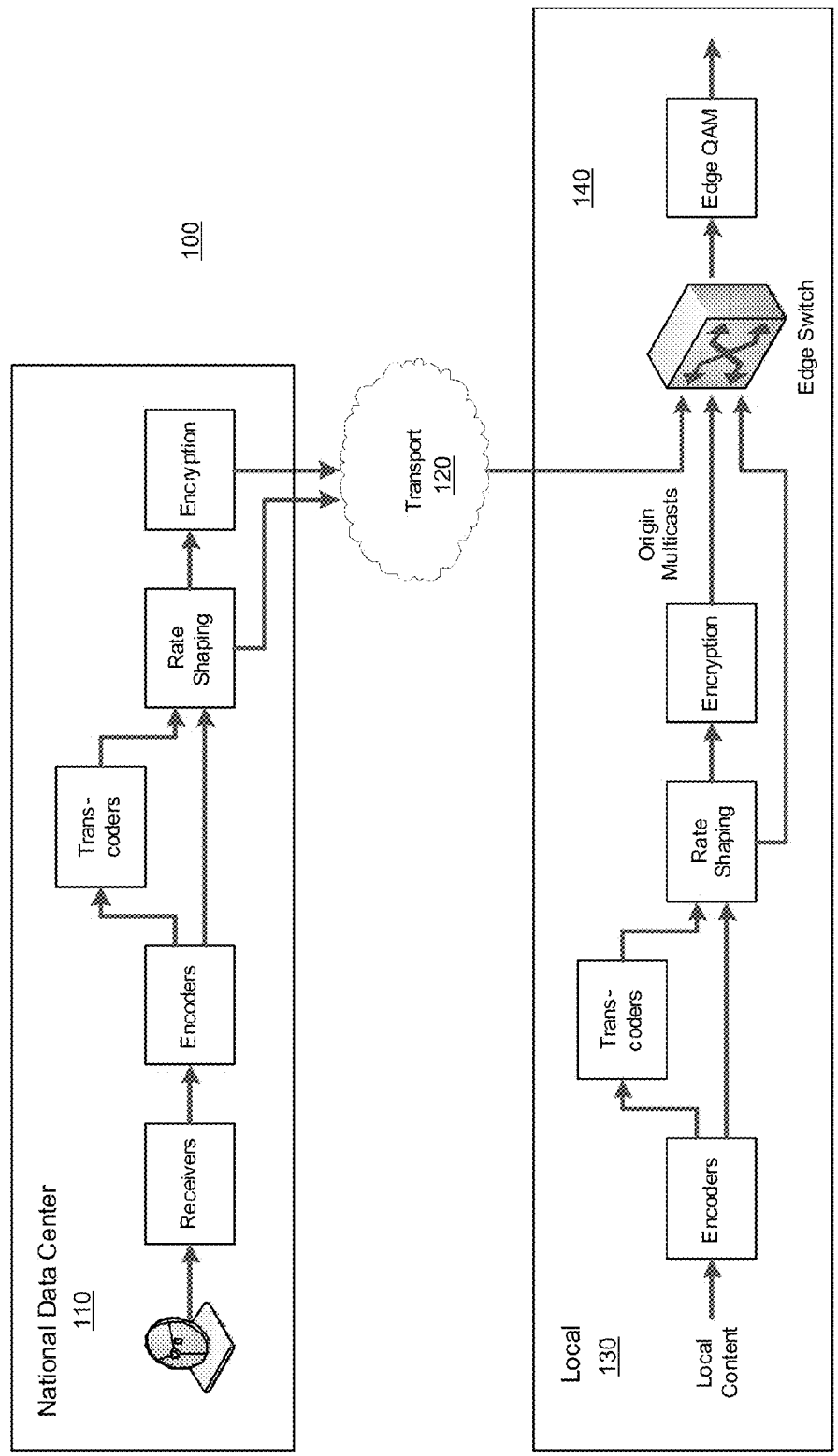
FIG. 1 is an example diagram of a network environment for delivering content according to conventional methods.

FIG. 1 is an example diagram of a network environment 100 for delivering content according to conventional methods.

As shown, a Video Service Provider (VSP) system 140 can ingest content over network 120 from a remote location such as national data center 110 for distribution to subscribers. As an alternative, the Video Service Provider (VSP) system 140 also can ingest content locally from local data center 130 for distribution to subscribers. The VSP system 130 initiates delivery of selected content to one or more subscribers in network environment 100.

At an ingest point such as local data center 130, the VSP 140 can be configured to include a set of encoders, transcoders, statistical multiplexers, rate shapers, and encryption devices (encryptors) to produce either a single program transport stream (SPTS) or multiple program transport stream (MPTS) carrying a linear channel or channels via IP multicast through a VSP network to respective subscribers that play back the content.

Figure 2:
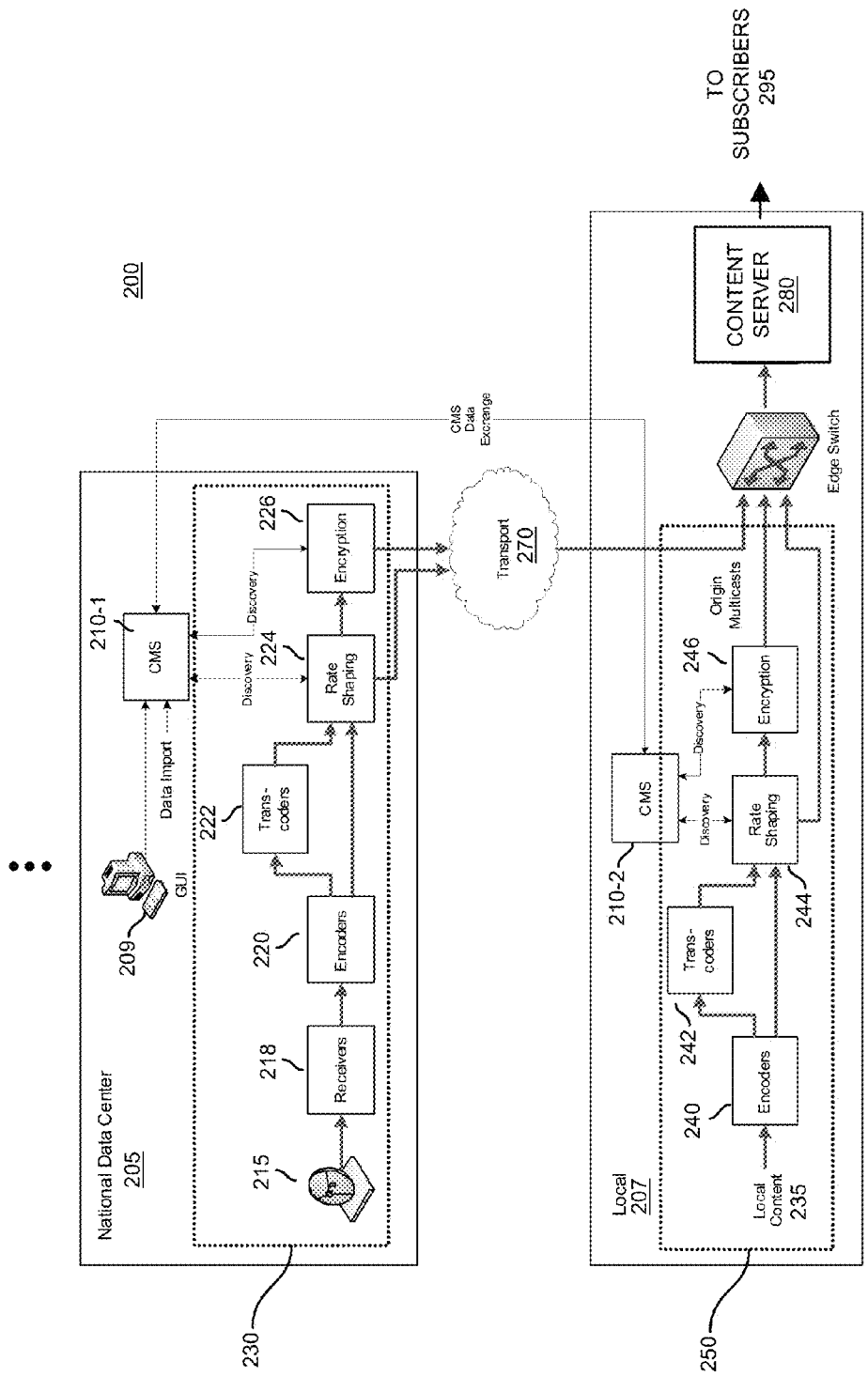
FIG. 2 is an example diagram illustrating content discovery in which multiple content management systems in a network environment discover and share configuration information according to embodiments herein.

FIG. 2 is an example diagram illustrating content discovery in which one or more content management systems 210 in a network environment 200 discover and share configuration information according to embodiments herein.

As shown, network environment 200 can include a national data center 205 and local data center 207. Network environment 200 can include any reasonable number of national data centers and local data centers in addition to those shown.

National data center 205 can be configured to produce and output streams of content or data channels that are available to subscribers nationwide. Local data center 207 can be configured to produce and output streams of content or data channels that are available to subscribers at a local or regional level.

In one embodiment, the national data center 205 includes processing resources to convert raw content from content source 215 into different formats. For example, the content processor 230 (e.g., a linear content source) in the national data center 205 can include receivers 218, encoders 220, transcoders 222, content delivery source 224 (e.g., a rate shaping module), and content delivery source 226 (e.g., an encryption module).

The content processor 230 in national data center 205 processes content received from content source 215 into different formats. For example, the content processor 230 can receive a first data stream of content from content source 215 and convert the first stream of data into multiple different formats; the content processor 230 can receive a second data stream of content from content source 215 and convert the second stream of data into multiple different formats; the content processor 230 can receive a third data stream of content from content source 215 and convert such a stream into multiple different formats; and so on.

In one embodiment, the local data center 207 includes resources to convert raw content from content source 235 into different formats. In such an embodiment, the content processor 250 in the local data center 207 includes resources such as encoders 240, transcoders 242, content delivery source 244 (e.g., a rate shaping module), and content delivery source 246 (e.g., an encryption module).

Via the content processor 250 and respective resources in local data center 207, the content processor 250 converts content received from content source 235 into different formats. For example, the content processor 250 (e.g., a source of one or more linear content channels) can receive a first data stream of content from content source 235 and convert such a stream into multiple different formats for distribution; the content processor 250 can receive a second data stream of content from content source 235 and convert such a stream into multiple different formats for distribution; the content processor 250 can receive a third data stream of content from content source 235 and convert such a stream into multiple different formats for distribution; and so on. As shown, the content delivery sources 244 and 246 can be configured to output the different formatted content (e.g., from content delivery sources 224, 226, 244, and 246) to content server 280. Content server 280 selectively stores or forwards the streams of different formatted content to subscribers as discussed herein.

In one embodiment, each content management system 210 (collectively, content management system 210-1, content management system 210-2, etc.) is configured to manage configuration information for a grouping of linear content sources (e.g., content processors). For example, via graphical user interface 209, the content management systems 210 can be manually configured with the addresses of the content delivery sources 224, 226, 244, 246, etc., for receiving different formatted content. The addresses can include a first address, second address, third, address, fourth address, etc. for retrieving different formatted content.

By way of a further non-limiting example, in one embodiment, via multicasting, the first address can be configured to output first content according to a first format, the second address can be configured to output the first content according to a second format, the third address of a content delivery source can be configured to output second content according to a first format, the fourth address of the content delivery source can be configured to output the second content according to a second format, and so on. Thus, groupings of addresses can be used to retrieve a particular type of content; each different address in the grouping can be configured to output the particular content according to an assigned encoding format.

The content management systems 210 can be configured with the addresses via manual programming. For example, an operator of graphical user interface 209 can configure the content management system 210-1 and/or content management system 210-2 with the addresses. The content management system 210 also can be configured via importing of configuration information (for example, CSV or XML) from one or more sources. A disadvantage of manual configuration is that data must be entered multiple times, once on the encoding or grooming devices and then again on the content management system. Manual entry of configuration information via the graphical user interface 209 also may be tedious and may lead to configuration errors. This is especially true when ingesting a large number of linear channels and then making them available in a variety of formats and at different bit rates.

For example, the content server 280 can be configured to distribute content from the national data center 205 and local data center 207 according to the following formats: MPEG-4 HD, MPEG-4 SD, MPEG2 HD, MPEG2 SD, and 3GP for mobile applications. If the content server 280 ingests 200 channels of different content (e.g., movies, news programs, etc.) and provides 5 formatted versions of content for each channel of content to cover different formats, the operator of graphical user interface 209 must configure 1000 linear channels in both the content management system 210-1 and encoding/grooming systems.

Note that the content delivery sources in network environment 200 may produce multiple copies of each channel of formatted content for redundancy purposes. In such an instance, if the operator of graphical user interface 209 must track two copies for each content channel for redundancy reasons, then the manual operator must keep track of which ports the 2000 linear channels are available. This number increases further in order to support adaptive bit rate content.

Embodiments herein include one or more content management systems 210 to automatically discover configuration information associated with the content delivery sources. For example, the content management systems utilize the contact information 300, shown in FIG. 3, to communicate with one or more content delivery sources to identify a port or address from which to receive the content via a multicast session in which multiple recipients simultaneously receive streaming of the content from the port.

In one embodiment, to learn of the different addresses on which different formatted content is available from each of multiple content delivery sources, the content management systems 210 communicate with the content delivery sources and/or other content management systems 210 to obtain the addresses on which the different formatted content is available to the content server 280 for distribution to subscribers.

Communicating with one or more content delivery sources (such as content delivery source 224, 226, 244, 246) can include "pushing" or "pulling" of configuration information. For example, each content management system 210 can be configured to poll different resources such as content delivery sources 224, 226, 244, 246, etc., for address information.

Subsequent to retrieval of address information on which to retrieve content, the content management systems 210 can be configured to forward copies of the retrieved address information to other content management system. Each content management system 210 thus can be aware of the different addresses on which different formatted content is available from the different content delivery sources.

In accordance with other embodiments, the different resources such as content delivery sources 224, 226, 244, 246, etc., and/or other content management systems can be configured to push or forward address information to a respective content management system 210 that manages respective configuration information associated with the respective content processor. The content management systems 210 can be configured to forward copies of the received address information to other content management system. Each content management system 210 thus can be aware of the different addresses on which different formatted content is available from the different content delivery sources.

According to one embodiment, each of the content management systems 210 automatically discovers presence of available content and respective content delivery addresses by querying the content delivery sources such as encoding and grooming devices (e.g., content delivery sources 224, 226, 244, and 246) that output the content such as linear content multicasts. Each content management system at the local level (e.g., in or near a local data center) can be configured to query all of the devices located in the local region, while each content management system at the national level (e.g., in or near a national data center) can be configured to obtain linear multicasts information from the devices at the national data centers. In other words, according to one embodiment, the content management system 210-1 communicates with the content delivery source 224 and content delivery source 226 to retrieve configuration information; the content management system 210-2 communicates with the content delivery source 244 and content delivery source 246 to retrieve configuration information; and so on.

As previously discussed, the instances of content management systems 210 can be configured to exchange the configuration information to produce a national picture of the linear channel content that is available on the VSP network.

A number of challenges may exist with auto discovery of content channels and addresses as discussed herein. For example, the interfaces of the content delivery devices may be proprietary; a device query interface may not provide sufficient details of desired configuration information; a linear channel name may be used to identify the channel, etc.

In one embodiment, in order to manage each linear multicast content, the content management system may require, for each content channel, retrieval of configuration information such as:

Linear Channel Name
Source ID or Station ID for a respective linear channel (if available)
Input Port IP Address on the device (if available)
Output Port IP Address on the device (if available)
Destination IP Address and Port (may be a multicast)
Program Number for a respective linear channel (if using an MPTS)
Bandwidth for a respective linear channel (peak and average)
Format for a respective linear channel (MPEG-2, H.264, etc.)
Encryption Type for a respective linear channel Each content delivery source or other source, from which a respective content management system communicates, can include a query interface for retrieval of the above information stored and maintained by the respective configuration information source.

Note that some of the above configuration information may not be available for receipt through a source such as the content delivery source's query interface. For example, a query interface of a device queried by a respective content management system may not provide content format information. In many of these cases, a default value can be assumed for the format. In one embodiment, each content management system can be configured to have a set of defaults for each device based on its capabilities and how the service provider typically deploys the device.

FIG. 3 is a diagram illustrating an example of contact information used by a content management system to communicate with one or more content delivery sources for discovery of channel configuration information according to embodiments herein.

In order to discover addresses of the available content in the system, the operator or other suitable source can enter contact information 300 into a respective content management system. As shown in FIG. 3, the contact information 300 can include information such as the management IP address (e.g., address on which to communicate with a respective query interface of the configuration information source), device type, device location of the encoding and grooming equipment, etc.

FIG. 3 illustrates an example of contact information 300 for communicating with and obtaining configuration information from content delivery sources.

As shown, "National.Encoder01" is the name of a first content delivery source in the national data center 205; the address for communicating with the first content delivery source is "10.100.3.4"; the first content delivery source is of the type "Encoder Type 1000"; the first content delivery source is located at "National.Loc1". Via this first row of contact information for the first content delivery source, a respective content management system knows a name and a type of the first content delivery source, the address on which to communicate with the first content delivery source, and the location of the content delivery source in network environment 200.

"National.Encoder02" is the name of a second content delivery source in the national data center 205; the address for communicating with the second content delivery source is "10.100.3.101"; the second content delivery source is also of the type "Encoder Type 1000"; the second content delivery source is located at "National.Loc1". Via this second row of contact information 300 for the second content delivery source, a respective content management system knows a name and a type of the second content delivery source, the address on which to communicate with the second content delivery source, and the location of the second content delivery source in network environment 200.

"Local Encoder01" (located in the local data center 207) is the name of a third content delivery source; the address for communicating with the third content delivery source is "10.100.5.12"; the third content delivery source is of the type "Encoder Type 2000"; the third content delivery source is located at "Philly.Loc2". Via this third row of contact information 300, a respective content management system knows a name and a type of the third content delivery source, the address on which to communicate with the third content delivery source, and the location of the third content delivery source in network environment 200.

The management IP address for each source entry allows a respective content management system to query the device in order to obtain configuration information from the content delivery source. The device type enables a respective content management system to know the message format used to communicate with that device and the type of information that the content management system can extract from the device. The location is the originating location for the content output by that content delivery source.

Note that national content may be available throughout a VSP footprint, while local content may be available only locally in a specific region. As an example, a first set of subscribers 295 in a first region may have access to content from national data center 205 and local data center 207. However, a second set of subscribers, in a second region at a remote location with respect to the first set of subscribers, may have access to content outputted by the national data center 205 as well as content outputted by a local data center other than local data center 207.

At a minimum, a respective content management system 210 can be configured with the device information of a group of devices that multicast content onto the VSP distribution network, not necessarily all of the devices that are involved in the encoding and grooming sequence.

For example, a channel may be encoded by one device such as an encoder 220, transcoded by another device such as transcoder 222, rate clamped to a certain bit rate by another device such as content delivery source 224 (e.g., a rate shaping device), and finally encrypted by yet a different device such as content delivery source 226 (e.g., an encryption module). The rate shaping device (content delivery source 224) and/or encryptor device (e.g., content delivery source 226) can be configured to multicast the resulting one or more streams of content over a distribution network such as network 270 through content server 280 to respective subscribers 295. Thus, outputted content can be encrypted or unencrypted.

According to embodiments herein, the content management system 210 can be configured with rate shaping device information and/or encryptor device information so that the respective content management system 210 can discover content streams originating from a rate shaping device (e.g., content delivery source 224) and/or an encryptor device (e.g., content delivery source 226).

As discussed above, in one embodiment, the content delivery source 226 includes an encryption module for encrypting data received from the content delivery source 224 (e.g., rate shaping device). If encryption is not desired, the content can be retrieved from the content delivery source 224, which includes unencrypted data. The content delivery sources 224 and 226 outputs content according to different formats over network 270 for distribution to clients such as subscribers 295.

FIG. 4 is a diagram illustrating an example of retrieved path configuration information 400 for each of multiple data channels according to embodiments herein.

In one embodiment, the content management systems 210 communicate with the content delivery sources (or other management resources) to learn of configuration associated with each content channel.

For example, a respective content management system 210 may be configured to track a linear content channel from its input point in the system through all of the encoding and grooming devices until the point that the content is multicast onto a VSP distribution network. In such an instance, the operator configures a respective content management system with all encoder and grooming device contact information. Via communications, the respective content management system can extract linear channel information from each content delivery source and build a listing of path configuration information 400 illustrating details of the path of each linear channel through the devices and onto the distribution network.

More specifically, path configuration information 400 shows example paths of linear content channels through the system until they are multicast on the distribution network. For example, for content associated with the USA NETWORK®, the original content stream is input to a respective encoder on port (e.g., address) 10.100.1.1. The respective encoder outputs an encoded version of the content to the input of a respective transcoder on port 10.100.2.1. The transcoder transmits the transcoded content stream to the input of a respective Rate Shaper (such as content delivery source 224) at address 10.100.3.1. The Rate Shaper transmits the content stream to the input of a respective Encryptor at address 10.100.4.1. Finally, the encryptor (such as content delivery source 226) outputs or transmits the content stream via a multicast on address 224.1.1.1.

In a similar manner, for THE HISTORY CHANNEL®, the original content stream is input to a respective encoder on port (e.g., address) 10.100.6.1. The respective encoder outputs an encoded version of the content to the input of a respective transcoder on port 10.100.7.1. The transcoder transmits the transcoded content stream to the input of a respective Rate Shaper (such as content delivery source 224) at address 10.100.8.1. The Rate Shaper transmits the content stream to the input of a respective Encryptor at address 10.100.9.1. Finally, the encryptor (such as content delivery source 226) outputs or transmits the content stream via a multicast on address 224.1.1.2.

As previously discussed, in one embodiment, subsequent to retrieving the configuration information from a respective source, the content management system can distribute the data to all of the other content management systems.

By way of a non-limiting example, and in view of the above embodiment, a content management system can communicate with a content delivery source to retrieve channel information, the channel information indicating a configuration of multiple resources in the content delivery source that process the content into multiple different formats for multicasting of the content in the network environment. The retrieved channel information can further include identities of the multiple resources and specify an interconnectivity of the multiple resources to produce the content into multiple different formats.

Figure 5:
FIG. 5 is an example diagram illustrating channel name translation according to embodiments herein.

FIG. 5 is an example diagram illustrating channel name mapping according to embodiments herein.

A source ID is typically a useful way to identify a corresponding linear channel since the source ID originates with an EPG (e.g., Electronic Program Guide) data provider, such as TV GUIDE® or TRIBUNE®, etc.

The source ID for a specific linear channel typically does not change. However, the source ID for a respective content channel may not be available based on a query to content delivery source. Therefore, the Channel Name may be used as a channel identifier.

The challenge with using a Channel Name as the channel identifier is that the Linear Channel Name can be entered and tracked in many different ways. For example, the channel name may be the call sign or it may be the long version of the channel name. Some system operators may abbreviate parts of the name. For example, "HBO® East" may be entered as "HBO E" or "HBO_E" in the system.

To handle the case of the conflicting names for the same linear channel, each content management system can be configured with common names for each linear content channel. In such an embodiment, the content management system will maintain a listing that maps common names to the linear channel identifier (source ID). For example, the listing 500 in FIG. 5 shows a possible mapping table for the names for the HBO East channel. Embodiments herein include generating a channel name mapping table (e.g., listing 500). The channel name mapping table can include: i) multiple different names of a channel that outputs the content from the address of the content delivery source, ii) an actual name for the channel, and iii) a numerical source identifier value representative of the channel.

When a respective content management system obtains linear channel configuration information from a device for a particular channel, the content management system looks up the name in the mapping table. If a match is found, the content management system uses the actual channel name specified in the listing along with the specified source ID. Otherwise, the content management system uses the value specified in the received configuration information. The content management system may report an error to the operator if the name was not found in the listing 500 so that the operator can manually verify the specified channel and update the mapping table.

In one embodiment, the linear channel configuration information is distributed to all content management system instances. Each content management system thus obtains a list of all linear content channels in the system. The content management system can then search for conflicting data, such as linear content channels, using the same multicast address.

When configuring a new linear channel, it may be useful to guarantee that the channel will be transmitted using a unique multicast address for a given multicast source. In one embodiment, the content management system provides an interface to request unused multicast addresses in order to configure new linear channels. For example, if an operator needs to configure HBO® West, the operator can use a user interface of the content management system to request an available multicast address. In such an instance, the content management system will return an unused address and mark that address as being reserved. The content management system should discover the use of that multicast address when it next queries the encoder/grooming devices.

In further embodiments, each content management system can be configured to a registration interface. The registration interface can be a standard interface enabling an encoder/grooming device (e.g., content delivery source) to register the linear channel configuration information with the content management system. In such an instance, the content management system listens for configuration messages from the encoder/grooming device. When the content delivery source receives a message, the content management system updates the linear channel configuration information based on the data received from the content delivery source.

The content delivery sources (e.g., encoder/grooming devices) can be configured with the URL or address of one or more content management systems to which the configuration information will be transmitted. When the content delivery source (encoder/grooming device) is started up, the content delivery source is configured with a new linear channel, configuration for an existing channel changes, or the channel or device status changes. The content delivery source sends a message including the linear channel configuration data to the one or more content management systems.

In one embodiment, the content delivery sources report the following data for each linear channel such as:

Linear Channel Name for a respective content channel
Source ID or Station ID for a respective content channel
Input Port IP Address on the device for a respective content channel
Output Port IP Address on the device for a respective content channel
Destination IP Address and Port (maybe a multicast)
Program Number (if using an MPTS) for a respective content channel
Bandwidth (peak and average) for a respective content channel
Format (MPEG-2, H.264, etc.) for a respective content channel
Encryption Type for a respective content channel
Status (Operational|Failed|Deleted) of a respective content channel In addition to reporting the above configuration information to a content management system, the content delivery source can report basic device information such as:

Unique Device Name/ID
Location
Status (Operational|Failed)

The following example shows a sample configuration message that a configuration information source such as a content delivery source can send to the content management system. In this example, a message format is based on XML for passing of configuration information data to one or more respective content management systems:

```
<LinearChannelConfiguration>
    <Device
        deviceId="Philly.encoder01"
        location="Philly.DataCenter01"
        status="Operational"
    />
    <LinearChannel
        name="USA"
        sourceId="1200""
        inputIpAddress="10.100.1.1"
        outputIpAddress="10.100.2.1"
        destIpAddress="224.1.1.1"
        avgBW="2000"
        maxBW="2500"
        format="H.264"
        encryption="AES128"
        status="Operational"
    />
</LinearChannelConfiguration>
```

FIG. 6 is a diagram illustrating an example of configuration information 600 received from one or more configuration sources (e.g., content delivery sources) for each of multiple data channels according to embodiments herein.

The configuration information 600 for each channel (e.g., row) can indicate a source identifier value assigned to the available content, a name of the available content, a CODEC type used to encode the content for the respective content channel, a video standard for the content, a bit rate of the available content, and an address on which the content can be retrieved. Based on the configuration information 600, the format information associated with available content can indicate at least one processing parameter in a group consisting of: a CODEC used to process the content, a playback resolution of the content, and a bit rate of the content outputted by the address.

As an example, the first row of the configuration information 600 indicates that the multicast address 224.1.1.1 outputs content from source identifier 1104 according to a first format (e.g., MPEG-2, SD, 3.75 Mbps); the second row of the configuration information 600 indicates that the multicast address 224.1.1.2 outputs content from source identifier 1104 according to a second format (e.g., MPEG-2, HD, 15.0 Mbps); the third row of the configuration information 600 indicates that the multicast address 224.1.1.3 outputs content from source identifier 1104 according to a third format (e.g., H.264, SD, 2.0 Mbps); the fourth row of the configuration information 600 indicates that the multicast address 224.1.1.4 outputs content from source identifier 1104 according to a fourth format (e.g., H.264, HD, 8.0 Mbps); and so on.

As a further example, the fifth row of the configuration information 600 indicates that the multicast address 224.1.1.5 outputs content from source identifier 1200 according to a first format (e.g., MPEG-2, SD, 3.75 Mbps); the sixth row of the configuration information 600 indicates that the multicast address 224.1.1.6 outputs content from source identifier 1200 according to a second format (e.g., MPEG-2, HD, 15.0 Mbps); the seventh row of the configuration information 600 indicates that the multicast address 224.1.1.7 outputs content from source identifier 1200 according to a third format (e.g., H.264, SD, 2.0 Mbps); the eighth row of the configuration information 600 indicates that the multicast address 224.1.1.8 outputs content from source identifier 1200 according to a fourth format (e.g., H.264, HD, 8.0 Mbps); and so on.

Figure 7:
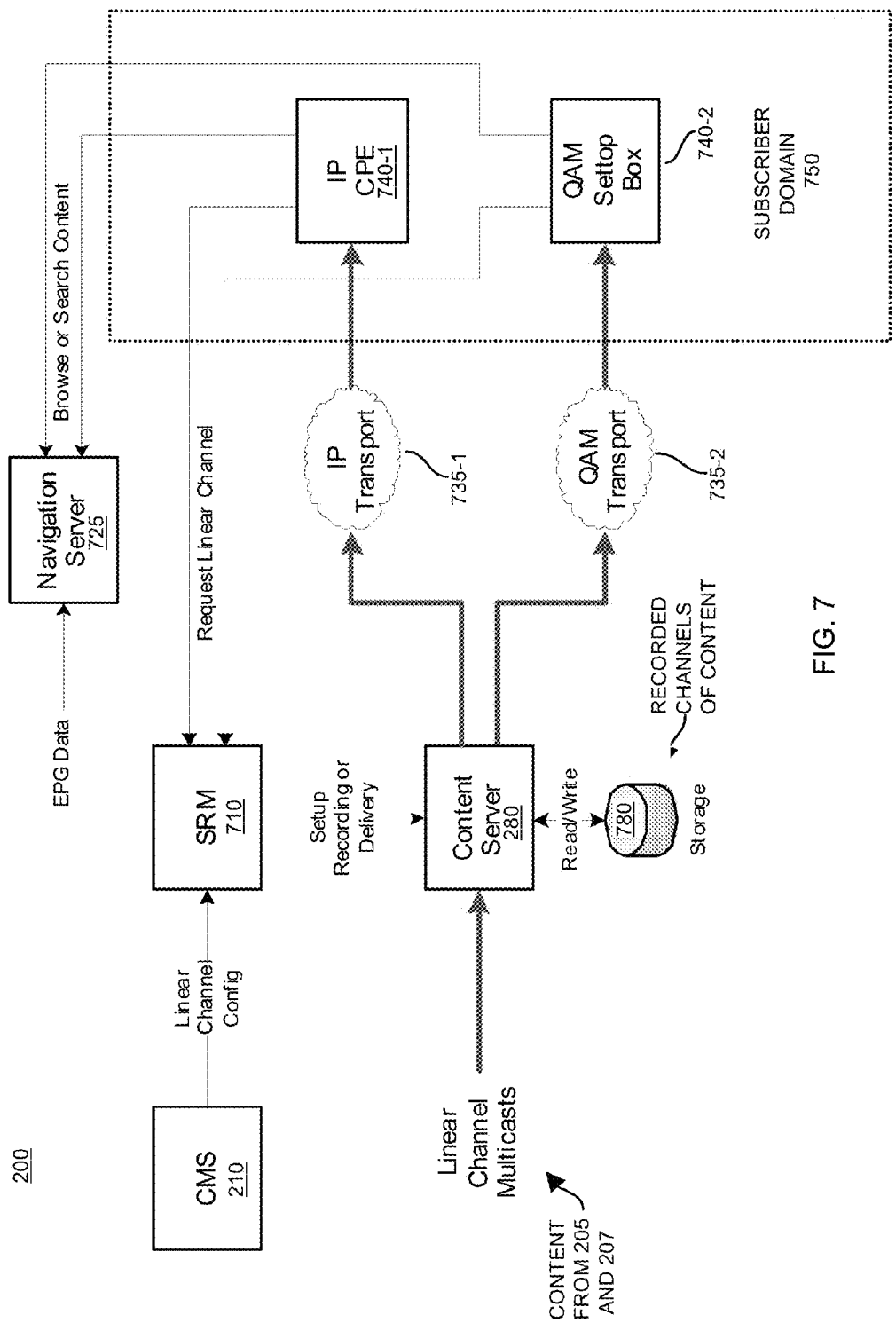
FIG. 7 is an example diagram illustrating use of discovered configuration information to serve requested content to one or more subscribers in a network according to embodiments herein.

FIG. 7 is an example diagram illustrating use of discovered configuration information to obtain requested content for one or more subscribers in a network environment 200 according to embodiments herein. Retrieved content can be stored or transmitted to the subscriber for playback.

As previously discussed, one or more content management systems 210 discover the configuration information 600 for retrieval of content on linear channels. In one embodiment, the content management systems 210 provide the configuration information 600 to the session and resource manager (SRM) 710. Note that the session and resource manager 710 can be integrated as or included as part of the content server 280.

The session and resource manager 710 receives linear channel configuration information 600 from one or more content management systems 210 in network environment 200. The session and resource manager 710 directs the content server 280 to record requested content into storage repository 780 or deliver the requested linear channel content to a respective subscriber based on the capabilities of a respective client device operated by the subscriber requesting the content.

As shown, network environment 200 can include navigation server 725. In one embodiment, the navigation server 725 uses Electronic Program Guide (EPG) data to provide a listing of programs available for the subscriber to watch or record. Typically a scheduling source such as TV GUIDE® provides the scheduling information of the different content available to the content server 280 for distribution to subscribers. As discussed above, the discovered configuration information 600 indicates the addresses on which the different formatted content is available for retrieval and distribution to subscribers.

Content server 280 accepts commands from the session and resource manager 710. Based on a received command from the session and resource manager 710, the content server 280 configures itself to receive content from one or more respective content delivery sources in the national data center 205 or the local data center 207.

In one embodiment, the content server 280 receives content (based on joining a linear channel multicast address). The content server 280 can either store the received content in repository 780 for later retrieval by a requesting subscriber or immediately deliver the requested content to the subscriber.

A subscriber in subscriber domain 750 can request and view content via use one or more different types of client devices in the subscriber domain. For example, the subscriber domain 750 can include client device 740-2 such as a QAM settop box and a client device 740-1 such as IP consumer premise equipment (CPE) 740-1.

The client device 740-2 can be configured to receive content such as video over a RF (Radio Frequency) network or QAM transport network 735-2. The client device 740-1 can be configured to receive video over an Internet Protocol (IP) transport network 735-1.

Note that network environment 200 can include multiple subscriber domains, each subscriber domain being similar to the subscriber domain 750 as discussed herein. Accordingly, multiple subscribers at the different subscriber domains can communicate with content server 280 to retrieve requested content.

Network environment 200 can include a navigation server 725. Sources such as TV GUIDE® and TRIBUNE® can provide Electronic Program Guide (EPG) data to the navigation server 725. The EPG data can include a list of programs on each network (linear channel), times or time slots in which a respective program air, and the source ID assigned to each network. The navigation server 725 utilizes the EPG data to produce schedule information indicating content availability.

In one embodiment, the navigation server 725 allows operators such as subscribers of the client devices 740 (one or more of client device 740-1 and client device 740-2) to retrieve schedule information. Accordingly, the subscribers in network environment 200 can be apprised of what content is available on each of the linear channels. In one embodiment, a respective subscriber utilizes a client device to access the navigation server 725 to retrieve the schedule information.

After searching or browsing the available programs as indicated in the schedule information, assume that a subscriber in subscriber domain 750 elects to watch or record selected content. In such an embodiment, the client device 740 operated by the subscriber sends a channel request to the session and resource manager 710 for the particular content. In one embodiment, the client device 740 requesting the selected content sends a message to the content server and/or session and resource manager 710 of its playback capability. The session and resource manager 710 and/or content server 280 can be pre-configured with the playback capability so that the client device need not send such information upon forwarding a request for content.

The content server 280 and the session and resource manager 710 can use the playback capability or configuration information of the respective requesting client device 740 to identify an appropriate format for the requested content.

In further embodiments, the session and resource manager 710 searches the configuration information 610 for the requested source ID of requested content. Multiple entries may be found representing the available formats of the requested content. The session and resource manager 710 uses the client device capability information (as received from the client or as retrieved from storage if pre-configured) to select the appropriate version of the requested content for playback on the requesting client device 740.

In one embodiment, the session and resource manager 710 directs the content server 280 to ingest or retrieve the selected content from a particular source address that outputs the content according to a suitable format. The content server 280 either stores a copy of the requested content in repository 780 or transmits the requested content to the client device 740 (over a respective network 735) for playback on the requesting client device 740. To facilitate retrieval of the requested content, the session and resource manager 710 provides the content server 280 with an appropriate multicast address of the requested content so that the content server 280 can ingest the content from the appropriate port of a content delivery source.

Figure 8:
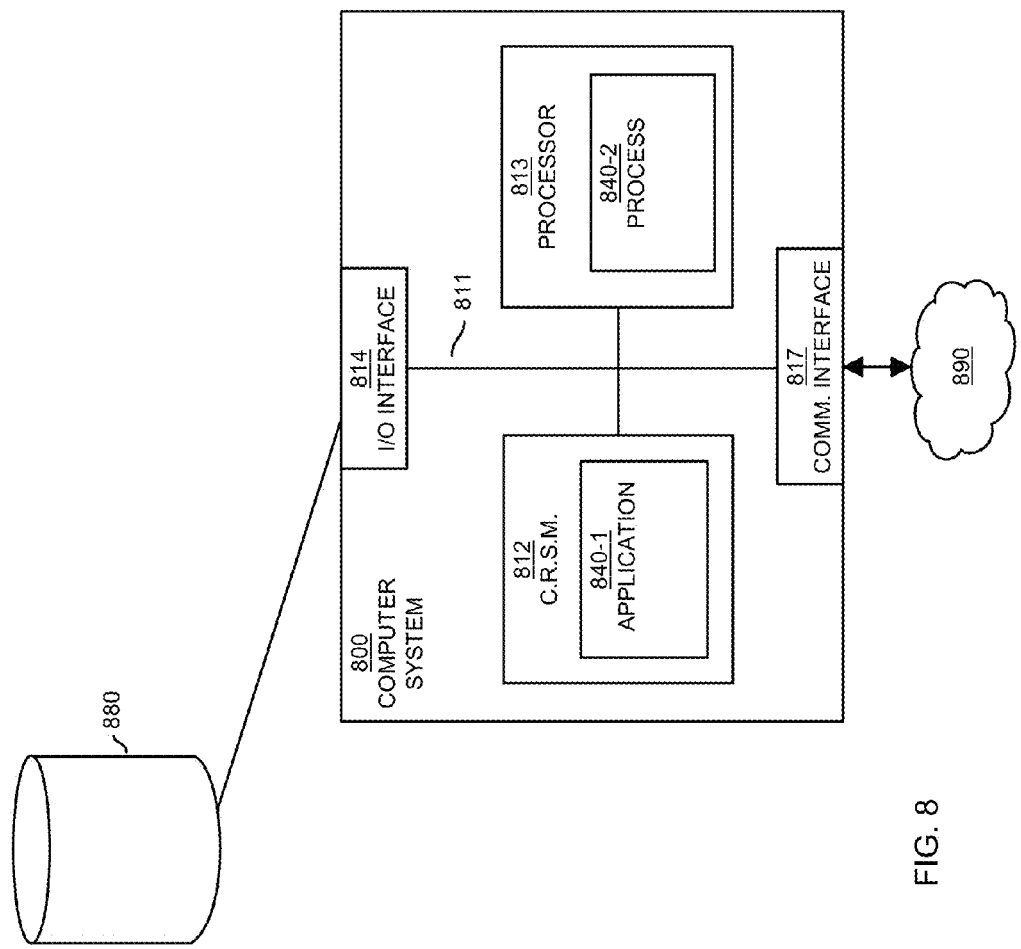
FIG. 8 is a diagram illustrating an example hardware architecture including a processor and encoded hardware storage medium according to embodiments herein.

FIG. 8 is an example block diagram of a computer system 800 for implementing any of the processing systems in network environment 200 such as the content management systems 210, content server 280, session and resource manager 710, content processor 230, content delivery sources, etc., according to embodiments herein.

Computer system 800 can be or include one or more computerized devices such as a personal computer, workstation, portable computing device, console, network terminal, processing device, network device, etc., operating as a server, client, etc.

As shown, computer system 800 of the present example can include an interconnect 811 that couples computer readable storage media 812 such as a non-transitory type of media in which digital information can be stored and retrieved, a processor 813, I/O interface 814, and a communications interface 817.

I/O interface 814 provides connectivity to a repository 880 and, if present, other devices such as display screen, peripheral devices such as a keyboard, a computer mouse, etc.

Computer readable storage medium 812 can be any non-transitory storage device such as memory, optical storage, hard drive, floppy disk, etc. In one embodiment, the computer readable storage medium 812 stores instructions and/or data.

Communications interface 817 enables the computer system 800 and processor 813 to communicate over a resource such as network 890 to retrieve information from remote sources and communicate with other computers. I/O interface 814 enables processor 813 to retrieve or attempt retrieval of stored information such as models, etc., from repository 880.

As shown, computer readable storage media 812 can be encoded with an application 840-1 (e.g., software, firmware, etc.) executed by processor 813. Application 840-1 can be configured to include instructions to implement any of the processing systems in network environment 200 such as the content management systems 210, content server 280, session and resource manager 710, content processor 230, content delivery sources, etc. In other words, any of the resources such as content management systems 210, content delivery sources 224, 226, 244, 246, content server 280, session and resource manager 710, etc. can include a computer 800 to execute respective functionality according to embodiments herein.

During operation of one embodiment, processor 813 accesses computer readable storage media 812 via the use of interconnect 811 in order to launch, run, execute, interpret or otherwise perform the instructions in application 840-1 stored on computer readable storage medium 812.

Execution of the application 840-1 produces processing functionality such as process 840-2 in processor 813. In other words, the process 840-2 associated with processor 813 represents one or more aspects of executing speech recognition application 840-1 within or upon the processor 813 in the computer system 800.

Those skilled in the art will understand that the computer system 800 can include other processes and/or software and hardware components, such as an operating system that controls allocation and use of hardware resources to execute application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 800 may reside at any location in a network environment 200 to implement functionality as discussed herein.

Functionality supported by network environment 200 and resources therein will now be discussed via flowcharts in FIGS. 9-12. Note that the steps in the flowcharts below can be executed in any suitable order.

Figure 9:
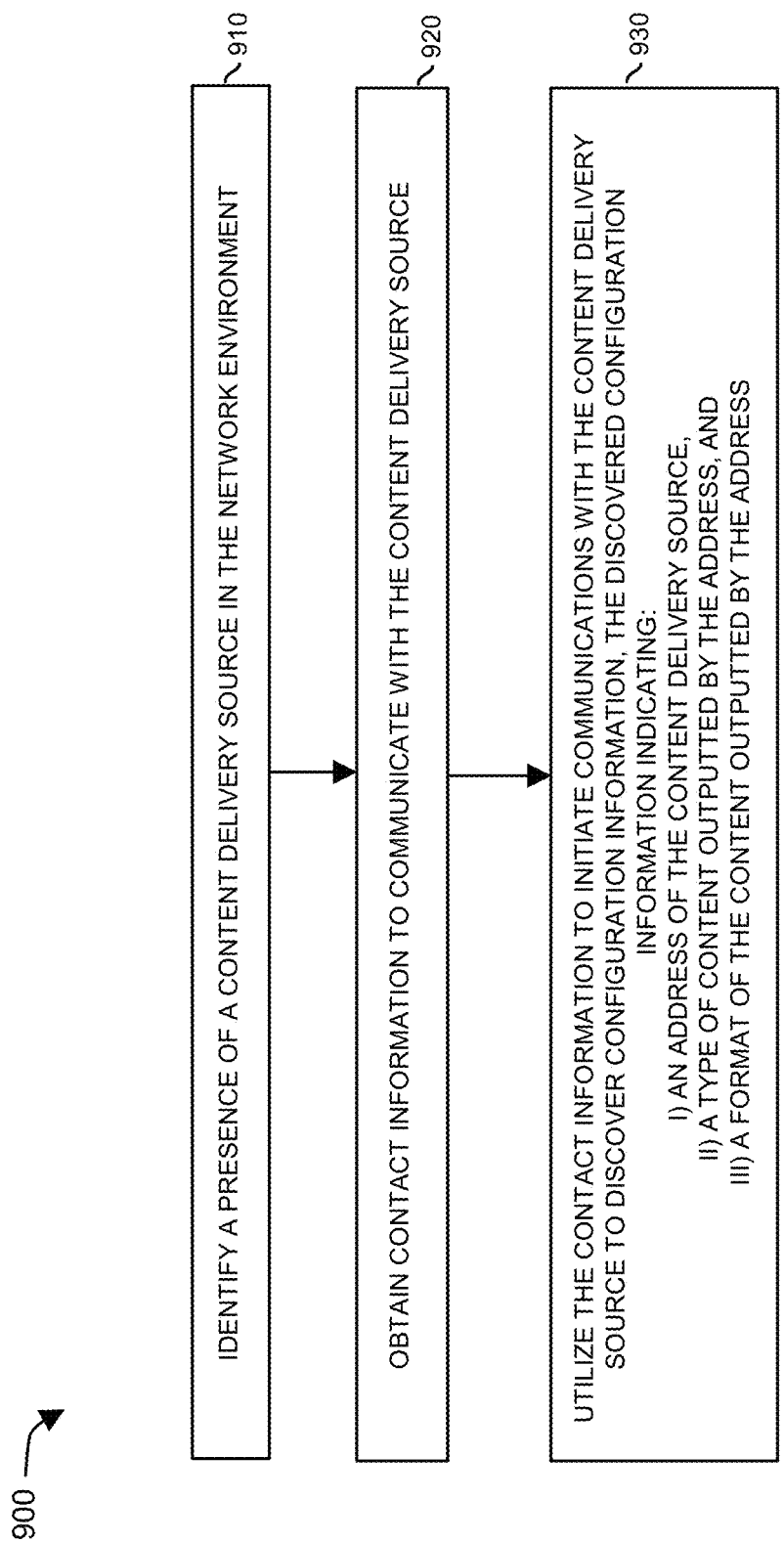

FIG. 9 is a flowchart 900 illustrating an example method of discovering configuration information according to embodiments herein. At least one computer device operating in network environment 200 carries out execution of the flowchart 900. Note that there will be some overlap with respect to concepts as discussed above.

In step 910, a content management system 210 identifies a presence of one or more content delivery sources (e.g., content delivery sources 224, 226, 244, 246, etc.) in the network environment 200.

In step 920, the content management system 210 obtains contact information 300 to communicate with one or more of the content delivery sources.

In step 930, the content management system 210 utilizes the contact information 300 to initiate communications with one or more of the content delivery sources to discover configuration information 600. In one embodiment, the discovered configuration information 600 indicates: i) an address of a respective content delivery source, ii) a type of content outputted by the address of the respective content delivery source, and iii) a format of the content outputted by the address.

Figure 10:
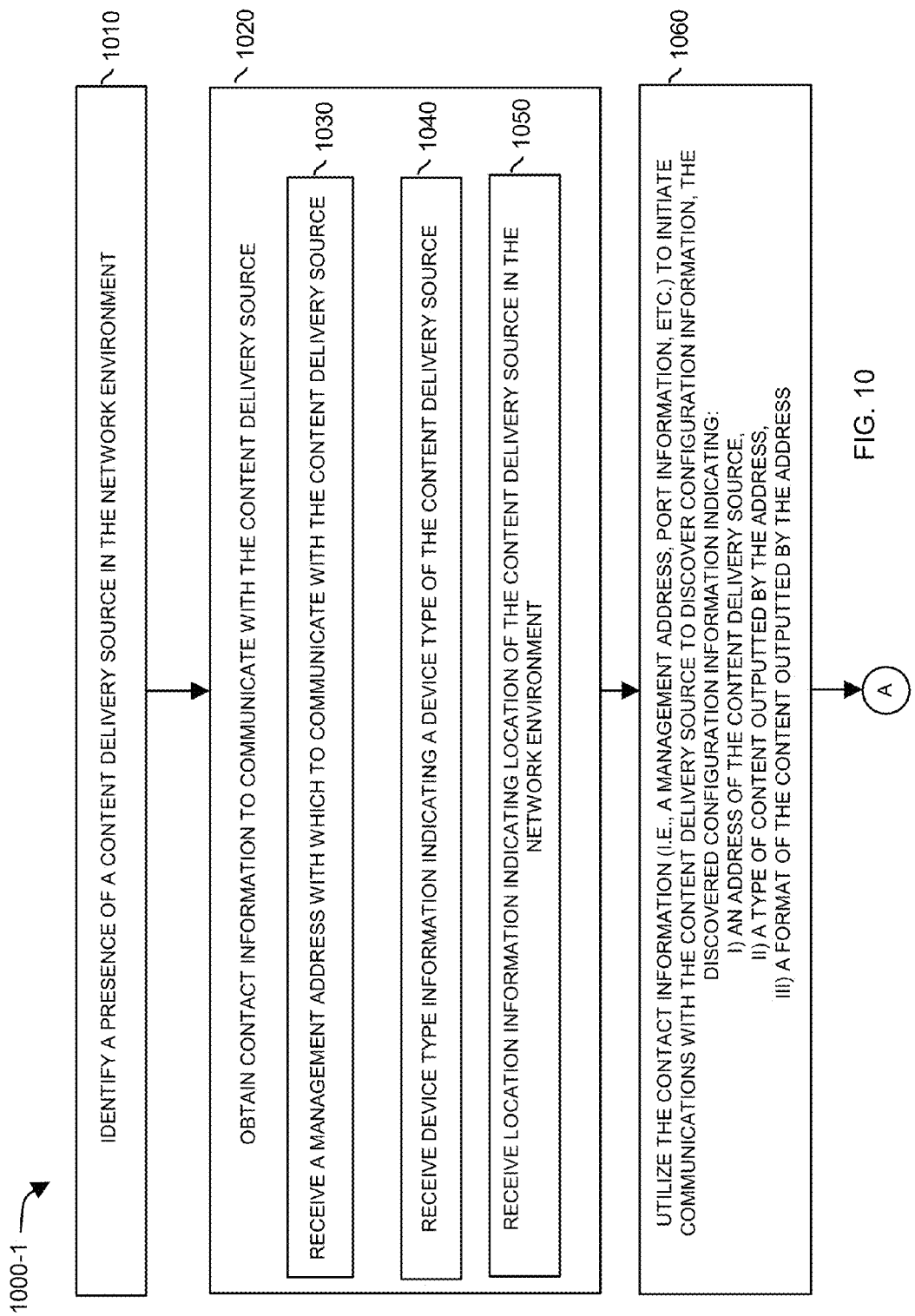
Figure 11:
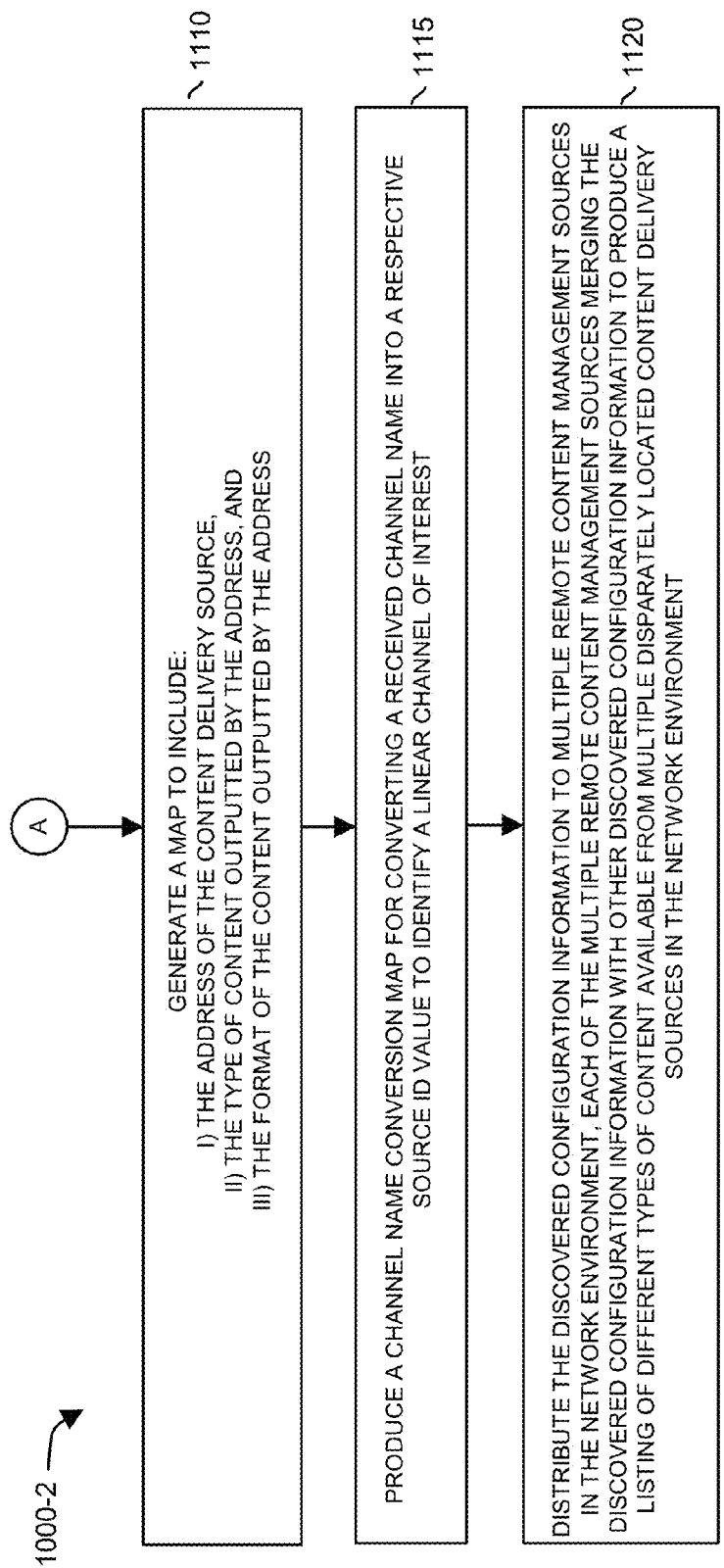

FIGS. 10 and 11 combine to form flowchart 1000 (e.g., flowchart 1000-1 and flowchart 1000-2) illustrating an example method of discovering configuration information according to embodiments herein. One or more computer devices operating in network environment 200 can be configured to carry out execution of the steps in flowchart 1000. Note that there will be some overlap with respect to concepts as discussed above.

In step 1010 of FIG. 10, a content management system 210 identifies a presence of one or more content delivery sources in the network environment 200.

In step 1020, the content management system 210 obtains contact information 300 to communicate with the one or more content delivery sources in network environment 200.

In step 1030, via the contact information 300, the content management system 210 receives a management address with which to communicate with a particular content delivery source in network environment 200.

In step 1040, the content management system 210 receives device type information indicating a device type of the particular content delivery source.

In step 1050, the content management system 210 receives location information indicating location of the particular content delivery source.

In step 1060, the content management system 210 utilizes the contact information such as management address, port information, etc., to initiate communications with the particular content delivery source to discover any or all of the configuration information 600. The discovered configuration information can include information such as: i) an address of the content delivery source, ii) a type of content outputted by the address, iii) a format of the content outputted by the address, etc.

In step 1110 in flowchart 1000-2 of FIG. 11, the content management system 210 generates a map or listing such as configuration information 600. Configuration information 600 can include: i) the address of the particular content delivery source, ii) the type of content outputted by the address, and iii) the format of the content outputted by the address. The configuration information 600 can include a row of configuration information for each address that outputs available content.

In step 1115 the content management system 210 is configured to produce a channel name conversion map (e.g., listing 500) for converting a received channel name into a respective source identifier value to identify a linear channel of interest.

In step 1120, the content management system 210 distributes the discovered configuration information 600 collected from one or more resources to each of one or more remote content management sources in the network environment 200. Each of the multiple remote content management sources can be configured to merge their discovered configuration information with configuration information discovered by other content management systems to produce a listing of any or all different types of content available from multiple disparately located content delivery sources in the network environment 200.

FIG. 12 is a flowchart 1200 illustrating an example method of utilizing discovered configuration information 600 according to embodiments herein. Note that there will be some overlap with respect to concepts as discussed above.

In step 1210, a content management system 210 utilizes the discovered configuration information received from a remote content management system to generate a map including a comprehensive set of configuration information 600 for content available from a national data center and a local data center.

In step 1220, the content management system 210 generates the map of configuration information 600 to include a first entry. The first entry indicates a first address of a corresponding content delivery source from which a particular type of content is retrievable from the corresponding content delivery source according to a first encoding format.

In step 1230, the content management system 210 generates the map to include a second entry. The second entry indicates a second address of the content delivery source from which the particular type of content is retrievable from the content delivery source according to a second encoding format.

In step 1240, a content server 280 receives a request for retrieval of the particular type of content from a client device 740 in the network environment 200.

In step 1250, the content server 280 identifies a suitable format for playback of the particular type of content on the client device. Assume in this example that the identified suitable format is the second encoding format.

In step 1260, the content server 280 utilizes the second entry of the discovered configuration information 600 to identify the second address.

In step 1270, the content server 280 establishes communications with a respective content delivery source via use of the second address to retrieve the particular type of content according to the suitable format.

In step 1280, the content server 280 serves the content retrieved from the second address to the client device 740.

Note again that techniques herein are well suited for use in content management and delivery network environments. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   identifying a presence of a content delivery source in a network environment that includes a plurality of content sources;
   obtaining contact information to communicate with the content delivery source;
   utilizing, at a first content management system, the contact information to initiate communications with the content delivery source to discover configuration information, the discovered configuration information indicating:
   i) an address of the content delivery source,
   ii) a type of content outputted by the address, and
   iii) a format of the content outputted by the address;
   communicating the discovered configuration information to a second content management system; and
   automatically managing configuration information for each content source in the plurality of content sources, the configuration information allowing for the retrieval of content according to a selected one of multiple different possible content formats, wherein contact information for each source in the plurality of content sources is used to query each source and obtain the configuration information for each source, and wherein the configuration information includes linear multicast information.

2. The method as in claim 1 further comprising:
   generating a map to include:
   i) the address of the content delivery source,
   ii) the type of content outputted by the address, and
   iii) the format of the content outputted by the address.

3. The method as in claim 1 further comprising:
   utilizing the discovered configuration information to generate a map;
   generating the map to include a first entry, the first entry indicating a first address of the content delivery source from which a particular type of content is retrievable from the content delivery source according to a first encoding format; and
   generating the map to include a second entry, the second entry indicating a second address of the content delivery source from which the particular type of content is retrievable from the content delivery source according to a second encoding format.

4. The method as in claim 3 further comprising:
   receiving, from a client device in the network environment, a request for retrieval of the particular type of content;
   identifying a suitable format for playback of the particular type of content on the client device, the suitable format being the second encoding format;
   accessing the second entry of the discovered configuration information in the map to identify the second address; and
   establishing communications with the content delivery source via the second address to retrieve the particular type of content according to the suitable format.

5. The method as in claim 1, wherein obtaining the contact information includes:
   receiving a management address with which to communicate with the content delivery source;

receiving device type information indicating a device type of the content delivery source; and receiving location information indicating location of the content delivery source in the network environment.

6. The method as in claim 1 further comprising:

communicating with the content delivery source to retrieve channel information, the channel information indicating a configuration of multiple resources in the content delivery source that process the content into multiple different formats for multicasting of the content in the network environment, wherein the retrieved channel information includes identities of the multiple resources, the channel information specifying an interconnectivity of the multiple resources to produce the content into multiple different formats.

7. The method as in claim 1, wherein utilizing the contact information includes:

communicating with the content delivery source to identify a port from which to receive the content via a multicast session in which multiple recipients simultaneously receive streaming of the content from the port.

8. The method as in claim 1, wherein the format of the content indicates at least one processing parameter in a group consisting of: a CODEC used to process the content, a playback resolution of the content, and a bit rate of the content outputted by the address.

9. The method as in claim 1 further comprising:

using a channel name mapping table to determine a numerical source identifier value, the channel name mapping table including:

i) multiple different names of a channel that outputs the content from the address of the content delivery source, ii) an actual name for the channel, and iii) the numerical source identifier value, the numerical source identifier value being representative of the channel.

10. The method as in claim 1 further comprising:

receiving, from a client device in the network environment, a request for retrieval of particular content;

identifying a suitable format for playback of the particular content on the client device;

accessing the discovered configuration information to identify the address of the content delivery source, the address of the content delivery source outputting the particular content according to the suitable format; and establishing communications with the address of the content delivery source to retrieve the particular content according to the suitable format.

11. The method of claim 1, further comprising:

automatically managing the configuration information for a grouping of linear content sources, wherein the grouping of linear content sources is included in the plurality of content sources, wherein the linear content sources include encoding and grooming devices and the encoding and grooming devices include a rate shaping device and an encryptor device.

12. The method of claim 1, wherein the content management system can store groups of addresses from which different types of content can be retrieved and different addresses within a particular address grouping can be used to obtain content according to different streaming formats.

13. The method of claim 1, wherein managing the configuration information includes normalizing the configuration information and merging the configuration information with other configuration information from one or more of the plurality of content sources.

14. The method of claim 1, wherein the linear multicast information from each source is used to build a listing of path configuration information that includes details of a path of each linear channel from each source.

15. A method comprising:

via at least one computer device operating in a network environment:

configuring a content delivery source, in the network environment that includes a plurality of content sources, with an address at a first content management system configured to keep track of content outputted by multiple content delivery sources including the content delivery source;

at the first content management system, communicating with the content delivery source to receive configuration information indicating:

i) an address of the content delivery source, ii) a type of content outputted by the address, and iii) a format of the content outputted by the address;

communicating the discovered configuration information to a second content management system; and automatically managing configuration information for each content source in the plurality of content sources, the configuration information allowing for the retrieval of content according to a selected one of multiple different possible content formats, wherein contact information for each source in the plurality of content sources is used to query each source and obtain the configuration information for each source, and wherein the configuration information includes linear multicast information.

16. A computer system comprising:

a processor;

a memory unit that stores instructions associated with an application executed by the processor; and an interconnect coupling the processor and the memory unit, enabling the computer system to execute the application and perform operations of:

identifying a presence of a content delivery source in the network environment that includes a plurality of content sources;

obtaining contact information to communicate with the content delivery source;

utilizing, at a first content management system, the contact information to initiate communications with the content delivery source to discover configuration information, the discovered configuration information indicating:

i) an address of the content delivery source, ii) a type of content outputted by the address, and iii) a format of the content outputted by the address;

communicating the discovered configuration information to a second content management system; and automatically managing configuration information for each content source in the plurality of content sources, the configuration information allowing for the retrieval of content according to a selected one of multiple different possible content formats, wherein contact information for each source in the plurality of content sources is used to query each source and obtain the configuration information for each source, and wherein the configuration information includes linear multicast information.

17. The computer system as in claim 16 further supporting operations of:

utilizing the discovered configuration information to generate a map;

generating the map to include a first entry, the first entry indicating a first address of the content delivery source from which a particular type of content is retrievable from the content delivery source according to a first encoding format; and generating the map to include a second entry, the second entry indicating a second address of the content delivery source from which the particular type of content is retrievable from the content delivery source according to a second encoding format.

18. The computer system as in claim 16 further supporting operations of:

receiving, from a client device in the network environment, a request for retrieval of the particular type of content;

identifying a suitable format for playback of the particular type of content on the client device, the suitable format being the second encoding format;

accessing the second entry of the discovered configuration information in the map to identify the second address; and establishing communications with the content delivery source via the second address to retrieve the particular type of content according to the suitable format.

19. The computer system as in claim 16, wherein obtaining the contact information includes:

receiving a management address with which to communicate with the content delivery source;

receiving device type information indicating a device type of the content delivery source; and receiving location information indicating location of the content delivery source in the network environment.

20. A non-transitory computer-readable storage medium having instructions stored thereon for processing data information, such that the instructions, when carried out by a processing device, cause the processing device to perform operations of:

identifying a presence of a content delivery source in the network environment that includes a plurality of content sources;

obtaining contact information to communicate with the content delivery source;

utilizing, at a first content management system, the contact information to initiate communications with the content delivery source to discover configuration information, the discovered configuration information indicating:

i) an address of the content delivery source, ii) a type of content outputted by the address, and iii) a format of the content outputted by the address;

communicating the discovered configuration information to a second content management system; and automatically managing configuration information for each content source in the plurality of content sources, the configuration information allowing for the retrieval of content according to a selected one of multiple different possible content formats, wherein contact information for each source in the plurality of content sources is used to query each source and obtain the configuration information for each source, and wherein the configuration information includes linear multicast information.

* * * * *